United States Patent Office 3,539,589
Patented Nov. 10, 1970

---

3,539,589
1-(α-PYRRYL)-2-AMINO ETHANOLS
Uberto M. Teotino and Davide Della Bella, Milan, Italy, assignors to Whitefin Holding S.A., Lugano, Switzerland
No Drawing. Filed May 8, 1967, Ser. No. 636,649
Claims priority, application Great Britain, May 17, 1966, 21,779/66
Int. Cl. C07d 27/22, 29/16, 87/22
U.S. Cl. 260—326.5                              4 Claims

ABSTRACT OF THE DISCLOSURE

Compounds acting on the central nervous system and on the peripheral nervous system, having the formula:

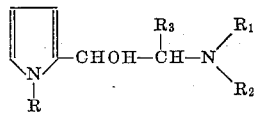

wherein R is alkyl, aryl or arylalkyl groups which may be substituted by one or more halogen atoms, alkyl, hydroxy, alkoxy, trifluoromethyl, nitro, amino, mono- or di-alkylamino radicals; $R_1$ is selected from the group comprising alkyl and cycloalkyl radicals; $R_2$ is an alkyl, or taken together with $R_1$ and the nitrogen atom to which they are attached is piperidinyl, pyrrolidinyl or morpholinyl; $R_3$ is selected from the group comprising a hydrogen atom and alkyl radicals and their salts with organic and inorganic acids and alkyl halides.

---

This invention relates to N,N-disubstituted pyrrylaminoethanols of the formula:

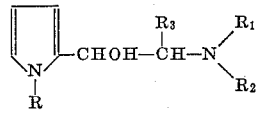   I wherein R is an alkyl, aryl or arylalkyl group which may be substituted by one or more halogen atoms, alkyl, hydroxy, alkoxy, trifluoromethyl, nitro, amino mono- or dialkylamino radicals; $R_1$ is an alkyl or cycloalkyl radical; $R_2$ is an alkyl, or arylalkyl group, or taken together with $R_1$ and the nitrogen atom to which they are attached, is a heterocyclic ring which may include a further hetero atom; and $R_3$ is a hydrogen atom or an alkyl radical, and their salts with organic and inorganic acids and alkyl halides.

This invention relates to disubstituted aminoethanols or their physiologically tolerable salts with acids or alkyl halides in admixture or conjunction with a pharmaceutically acceptable carrier or diluent.

The disubstituted aminoethanols of this invention can be prepared according to this invention by reducing a compound of the formula:

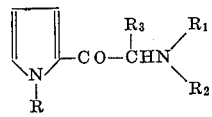   II wherein R, $R_1$, $R_2$ and $R_3$ have the meanings given above. The reduction is preferably carried out in the presence of an inert solvent with a reducing agent such as lithium aluminum hydride, sodium borohydride or aluminum isopropoxide at a temperature of from 0° to 90° C. for a period of from 2 to 60 hours. This method is particularly useful for reducing the keto-group only when there are present in the molecule other groups which may be affected by hydrogenation.

The starting materials of the Formula II may be prepared according to the processes disclosed in our patent specification Ser. No. 636,643 of even date herewith.

The acid addition salts of the new compounds of this invention can be prepared in the usual manner, that is by reacting the disubstituted aminoethanols with either the stoichiometric amount of organic or inorganic acid in water or in a water-miscible solvent, such as acetone or ethanol, with isolation of the salt by concentration and cooling or an excess of the acid in a water-immiscible solvent, such as diethyl ether or chloroform, with the desired salt separating directly. Exemplary of such organic salts are maleic, fumaric, benzoic, ascorbic, succinic, methanesulphonic, benzenesulphonic and hydroxy-benzoic acids. The preferred salts of this invention are salts of aromatic hydroxy-carboxylic acids as p.hydroxybenzoic, gentisic, gallic, protocatechuic, and β-resorcylic acid. Exemplary of such inorganic salts are those with hydrochloric, hydrobromic and sulphuric acids. The quaternary ammonium salts of this invention can be prepared by reacting a disubstituted aminoethanol of the general Formula I with a lower alkyl halide, such as methyl bromide or methyl iodide.

The new compounds of this invention exhibit significant properties on the central or peripheral nervous system. Particularly marked are the sedative and analgesic effects on the CNS. The analgesic activity has been tested in mice by the hot-plate test and by the stretching by injection of acetic acid. With regard to the latter test the $ED_{50}$ values in mice of 1-α-(N-o-chlorobenzyl)-pyrryl-2-disec.butylaminoethanol are 0.7 mg./100 g. subcutaneously and 1.5 mg./100 g. orally. By the oral route 1-α-(N-o-chlorobenzyl)-pyrryl-2-disec.butylaminoethanol is three times more potent than codeine, nine times more potent than aminopyrine and twelve times more potent than acetylsalicyclic acid. The peak analgesia occurs in 60 minutes, but the effect is marked also four hours after drug administration.

The study of the sedative activity has been carried out by testing:

(a) The behavior of animals treated with the new compounds of this invention; reduction of motility and lessened reactivity were noted.

(b) The influence of the effects of subhypnotic and hypnotic doses of barbiturates.

(c) The sedative effect on the cough centre previously excited by an ammoniacal aerosol in rat and by electrical stimulation of the superior laryngeal nerve in decerebrate cat. According to the last test the ED values are of from 8 to 20 mg./kg. in rat and from 5 to 10 mg./kg. intraperitoneally in cat.

The compounds of this invention have shown a very low toxicity: $LD_{50}$ values higher than 100 mg./kg. by the intraperitoneal route in mice; higher than 400 mg./kg. by the oral route in mice and rat. A daily administration of 100 mg./kg. for three months is well tolerated in rats. The examination of the tissues following slaughter did not reveal evidence of pathological changes and the hematologic values found were unaffected.

The compounds of this invention can be administered orally, subcutaneously or intravenously in any pharmaceutical form suitable for these administration routes.

The following examples illustrate the invention.

EXAMPLE I 5.4 g. (0.022 mol) of 1-benzyl-2-dimethylaminoacetylpyrrole and 40 ml. of methyl alcohol are placed in a 100 ml. four-necked flask fitted with a stirrer, a dropping funnel, a reflux condenser and a thermometer. The solution is stirred and a mixture of 1.7 g. (0.044 mol) of sodium borohydride in 4 ml. of water is added slowly through the dropping funnel at such a rate that the solvent refluxes gently without external heating. When the addition is complete and the initial reaction subsides, the mixture is stirred and heated at gentle reflux for six hours. The solvent is distilled off under reduced pressure and the residues is suspended in water and shaken with diethyl ether. The ether extract is dried over anhydrous magnesium sulphate, the solvent is removed by evaporation under reduced pressure and the oily residue is fractionated. Yield 4.9 g.; B.P. 120° C./0.4 mm. Hg.

By analogous procedures the following compounds have been prepared:

1-[α-(N-benzyl)-pyrryl]-2-diethylaminoethanol—B.P.=143–145° C./0.5 mm. Hg

1-[α-(N-benzyl)-pyrryl]-2-dipropylaminoethanol—B.P.=160–165° C./0.4 mm. Hg

1-[α-(N-benzyl)-pyrryl]-2-diisopropylaminoethanol—B.P.=155–160° C./0.4 mm. Hg

1-[α-(N-benzyl)-pyrryl]-2-dibutylaminoethanol—B.P.=158–163° C./0.4 mm. Hg

1-[α-(N-benzyl)-pyrryl]-2-disec. butylaminoethanol—B.P.=150–155° C./0.4 mm. Hg

1-[α-(N-benzyl)-pyrryl]-2-pyrrolidinoethanol—B.P.=148–153° C./0.4 mm. Hg

1-[α-(N-benzyl)-pyrryl]-2-piperidinoethanol—M.P.=50–52° C.

1-[α-(N-benzyl)-pyrryl]-2-morpholinoethanol—M.P.=44–47° C.

1-[α-(N-benzyl)-pyrryl]-2-(N′-benzyl-N′-methyl)-aminoethanol—B.P.=195–200° C./0.2 mm. Hg 1-[α-(N-benzyl)-pyrryl]-2-(N′-benzyl-N′-tertbutyl)-aminoethanol—M.P.=123–125° C.

1-[α-(N-methyl)-pyrryl]-2-pyrrolidinoethanol—M.P.=35–36° C.

1-[α-(N-methyl)-pyrryl]-2-piperidinoethanol—M.P.=53–54° C.

1-[α-(N-phenyl)-pyrryl]-2-diethylaminoethanol—B.P.=140–145° C./0.3 mm. Hg

1-[α-(N-phenyl)-pyrryl]-2-disec.butylaminoethanol—B.P.=135–140° C./0.3 mm. Hg

1-[α-(N-benzyl)-pyrryl]-2-diiso.butylaminoethanol—B.P.=160–165° C./0.4 mm. Hg

1-[α-(N-phenyl)-pyrryl]-2-pyrrolidinoethanol—B.P.=145–150° C./0.1–0.2 mm. Hg

1-[α-(N-phenyl)-pyrryl]-2-pyyrolidinoethanol hydrochloride—M.P.=119–121° C.

1-[α-(N-phenyl)-pyrryl]-2-piperidinoethanol—B.P.=155–160° C./0.1 mm. Hg

1-[α-(N-phenyl)-pyrryl]-2-piperidinoethanol hydrochloride—M.P.=140–142° C. (dec.)

1-[α-(N-o-chlorobenzyl)-pyrryl]-2-diethylaminoethanol—B.P.=150–155° C./0.2 mm. Hg 1-[α-(N-o-chlorobenzyl)-pyrryl]-2-disec.butylaminoethanol—B.P=160–165° C./0.1 mm. Hg 1-[α-(N-o-chlorobenzyl)-pyrryl]-2-disec.butylaminoethanol p-hydroxybenzoate—M.P.=128–130° C. (dec.)

1-[α-(N-o-chlorobenzyl)-pyrryl]-2-disec.butylaminoethanol a-resorcylate—M.P.=91–94° C. (dec.)

1-[α-(N-o-chlorobenzyl)-pyrryl]-2-disec.butylaminoethanol protocachuate—M.P.=60–70° C. (dec.)

1-[α-(N-o-chlorobenzyl)-pyrryl]-2-pyrrolidinoethanol—B.P=150–155° C./0.1 mm. Hg

1-[α-(N-o-chlorobenzyl)-pyrryl]-2-pyrrlodinoethanol hydrochloride—M.P.=137–138° C.

1-[α-(N-benzyl)-pyrryl]-2-diethylaminopropanol hydrochloride—M.P.=140–142° C. (dec.)

1-[α-(N-benzyl)-pyrryl]-2-pyrrolidinopropanol—B.P.=135–140° C./0.1–0.2 mm. Hg

1-[α-(N-benzyl)-pyrryl]-2-pyrrolidinopropanol hydrochloride—M.P.=140–142° C.

1-[α-(N-benzyl)-pyrryl]-2-piperidinopropanol—B.P=150–155° C./0.1–02 mm. Hg

1-[α-(N-p-chlorobenzyl)-pyrryl]-2-diethylaminoethanol—B.P.=160–165° C./0.1 mm. Hg 1-[α-(N-p-chlorobenzyl)-pyrryl]-2-disec.butylaminoethanol—B.P.=160–165° C./0.3 mm. Hg 1-[α-(N-p-chlorobenzyl)-pyrryl]-2-piperidinoethanol—B.P.=155–160° C./0.1 mm. Hg 1-[α-(N-p-chlorobenzyl)-pyrryl]-2-piperidinoethanol hydrochloride—M.P.=134–135° C.

1-[α-(N-p-chlorobenzyl)-pyrryl]-2-pyyrolidinoethanol—B.P.=145–155° C./0.1–0.2 mm. Hg 1-[α-(N-p-chlorobenzyl)-pyrryl]-2-pyyrolidinoethanol hydrochlorine—M.P.=121–122° C.

1-[α-(N-o-chlorobenzyl)-pyrryl]-2-disec.butylaminoethanol -resorcylate—M.P.=72–74° C. (dec.)

1-[α-(N-o-chlorobenzyl)-pyrryl]-2-piperidinoethanol—B.P.=140–142° C./0.1 mm. Hg

1-[α-(N-o-chlorobenzyl)-pyrryl]-2-piperidinoethanol hydrochloride—M.P.=125–126° C.

1-[α-(N-ethyl)-pyrryl]-2-diethylaminoethanol—B.P.=94–96° C./0.4 mm. Hg

1-[α-(N-benzyl)-pyrryl]-2-(N′-benzyl-N′-ethyl)-aminoethanol—B.P.=195–200° C./0.2 mm. Hg 1-[α-(N-ethyl)-pyrryl]-2-piperidinoethanol—B.P.=105–110° C./0.15 mm. Hg 1-[α-(N-ethyl)-pyrryl]-2-disec.butylaminoethanol—B.P.=100–105° C./0.2 mm. Hg 1-[α-(N-methyl)-pyrryl]-2-diethylaminoethanol—B.P.=90–95° C./0.3 mm. Hg 1-[α-(N-methyl)-pyrryl]-2-diethylaminoethanol p.hydroxybenzoate—M.P.=136–137° C./(dec.)

1-[α-(N-p-methoxybenzyl)-pyrryl]-2-piperidinoethanol—B.P.=175–185° C./0.3 mm. Hg 1-[α-(N-p-methoxybenzyl)-pyrryl]-2-piperidinoethanol oxalate—M.P.=114–115° C. (dec.)

1-[α-(N-2.6-xylyl)-pyrryl]-2-pyrrolidinoethanol—B.P.=150–160° C./0.2 mm. Hg

1-[α-(N-2.6-xylyl)-pyrryl]-2-pyrrolidinoethanol oxalate—M.P.=174–175° C.

1-[α-(N-p-bromobenzyl)-pyrryl]-2-pyrrolidinoethanol—B.P.=160–170° C./0.4 mm. Hg

1-[α-(N-p-bromobenzyl)-pyrryl]-2-pyrrolidinoethanol picrate—M.P.=131–132° C.

1-[α-(N-2.6-xylyl)-pyrryl]-2-piperidinoethanol—B.P.=165–170° C./2 mm. Hg

1-[α-(N-2.6-xylyl)-pyrryl]-2-piperidinoethanol oxalate—M.P.=163–164° C. (dec.)

1-[α-(N-ethyl)-pyrryl]-2-pyrrolidinoethanol—B.P.=115–125° C./0.5 mm. Hg

1-[α-(N-ethyl)-pyrryl]-2-pyrrolidinoethanol p-hydroxybenzoate—M.P.=145–147° C. (dec.).

EXAMPLE II 10 g. (0.0278 mol) of 1-(o-chloro)-benzyl-2-disec. butylaminoacetyl-pyrrole and 300 ml. of anhydrous diethyl ether are placed in a 500 ml. four necked flask with a mercury-sealed stirrer, a thermometer, a dropping funnel and a reflux condenser topped with a tube containing anhydrous calcium chloride. The solution is stirred and a mixture of 1 g. (0.0264 mol) of lithium aluminium hydride in 20 ml. of di-ethyl ether is added slowly through the dropping funnel at such a rate that the solvent refluxes gently without external heating. When the addition is complete and the initial reaction subsides, the mixture is stirred and heated at gentle reflux for two hours.

The mixture is cooled and the excess of lithium aluminum hydride is decomposed with cracked ice. The water layer is separated and washed with diethyl ether. The combined ether extracts are dried over anhydrous magnesium sulphate and the solvent is removed by distillation under reduced pressure. Yield, 8.8 g.; B.P.=160–165° C./ 0.1 mm. Hg.

An exemplary capsule suitable for oral administration has the following composition:

| | Mg. |
|---|---|
| 1-α-(N-o-chlorobenzyl)-pyrryl-2-disec.butylamino-ethanol p.hydroxybenzoate | 41.5 |
| Talcum | 3 |
| Dibasic calcium phosphate | 63.5 |
| Magnesium stearate | 2 |

124.5 g. of 1-α-(N-o-chlorobenzyl)-pyrryl-2-disec.butyl-aminoethanol p.hydroxybenzoate, 9 g. of talcum, 190.5 g. of dibasic calcium phosphate and 6 g. of magnesium stearate are mixed and sieved twice through an 80 mesh sieve. The mixture is transferred into a mixer and allowed to turn for 15 minutes. With this mixture are filled 3000 No. 4 natural hard gelatine capsules.

We claim:
1. A compound of the formula

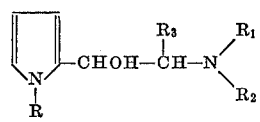

wherein R is selected from the group consisting of methyl, ethyl, phenyl and benzyl radicals which may contain one or two substituents selected from the group consisting of halogen, methyl and methoxy; $R_1$ is alkyl with 1–4 carbon atoms; $R_2$ is selected from the group consisting of alkyl with 1–4 carbon atoms and benzyl or taken together with $R_1$ and the nitrogen atom to which they are attached is a heterocyclic ring selected from the group consisting of piperidinyl, pyrrolidinyl and morpholinyl; $R_3$ is hydrogen or methyl; and its physiologically tolerable salts with organic acids, inorganic acids and alkyl halides.

2. 1-[α-(N-o-chlorobenzyl)-pyrryl]-2-disec.butylamino-ethanol.

3. Physiologically tolerable salts with organic acids of 1 - [α - (N - o-chlorobenzyl)-pyrryl]-2-disec.butylamino ethanol.

4. Physiologically tolerable salts with inorganic acids of 1 - [α-(N-o-chlorobenzyl)-pyrryl]-2-disec.butylamino ethanol.

References Cited

Friz: Chemical Abstracts (1964), vol. 60, p. 6815 c.
Wagner et al.: John Wiley, N.Y. (1953), pp. 149 and 152.

ALEX MAZEL, Primary Examiner

B. I. DENTZ, Assistant Examiner

U.S. Cl. X.R.

260—247.5, 294.7; 424—248, 267, 274